(12) United States Patent  (10) Patent No.: US 7,404,482 B2
Deflandre  (45) Date of Patent: Jul. 29, 2008

(54) LATERAL GUIDING DEVICE FOR A HANDLING SYSTEM, AND HANDLING SYSTEM USING ONE SUCH DEVICE

(76) Inventor: Hervé Deflandre, 2C Rue des Crombions, 62840 Fleurbaix (FR)

( * ) Notice: Subject to any disclaimer, the term of this patent is extended or adjusted under 35 U.S.C. 154(b) by 0 days.

(21) Appl. No.: 11/596,492

(22) PCT Filed: May 10, 2005

(86) PCT No.: PCT/FR2005/001169

§ 371 (c)(1),
(2), (4) Date: Apr. 9, 2007

(87) PCT Pub. No.: WO2005/120993

PCT Pub. Date: Dec. 22, 2005

(65) Prior Publication Data

US 2007/0221473 A1  Sep. 27, 2007

(30) Foreign Application Priority Data

May 13, 2004 (FR) .................................. 04 05218

(51) Int. Cl.
*B65G 21/20* (2006.01)
(52) U.S. Cl. .................................. 198/836.3; 198/597
(58) Field of Classification Search ............ 198/370.11, 198/442, 597, 836.3, 890, 890.1
See application file for complete search history.

(56) References Cited

U.S. PATENT DOCUMENTS

| 2,425,158 | A |   | 8/1947  | Masich |
|-----------|---|---|---------|--------|
| 4,512,280 | A | * | 4/1985  | Lee, Jr. ........................ 118/426 |
| 4,711,342 | A | * | 12/1987 | Abraham .................. 198/463.3 |
| 4,909,372 | A |   | 3/1990  | Jones |
| 5,064,046 | A | * | 11/1991 | Janotik et al. ............. 193/35 SS |
| 5,123,517 | A | * | 6/1992  | Windau .................... 198/463.3 |
| 5,201,400 | A | * | 4/1993  | Abe ......................... 198/463.3 |
| 5,605,427 | A | * | 2/1997  | Hammond .................. 414/276 |
| 5,868,239 | A | * | 2/1999  | Bonnet ................... 198/370.02 |
| 6,439,375 | B1| * | 8/2002  | Foster et al. ................. 198/775 |
| 6,585,473 | B2| * | 7/2003  | Turner ......................... 414/535 |
| 6,698,571 | B2| * | 3/2004  | Bonnet ................... 198/370.02 |

* cited by examiner

*Primary Examiner*—Douglas A Hess
(74) *Attorney, Agent, or Firm*—Ladas & Parry LLP

(57) ABSTRACT

A lateral guidance device including a hollow guide located along the conveyor track of a goods handling system on which products are guided laterally, composed of profiles that fit together with each other, each with an inner face and outer face, one of which is used for guidance purposes. An expandable chamber, housed in the hollow guide, is supplied with expansion fluid from a supply means. The outer faces are returned in to a position of minimum distance (dmin) between these faces by return means, when the fluid feed to the expandable chamber ceases. Thus, the distance between the outer faces is proportional to the supplying of the chamber with expansion fluid, between a minimum distance (dmin) and maximum (dmax).

14 Claims, 4 Drawing Sheets

Figure 1A:
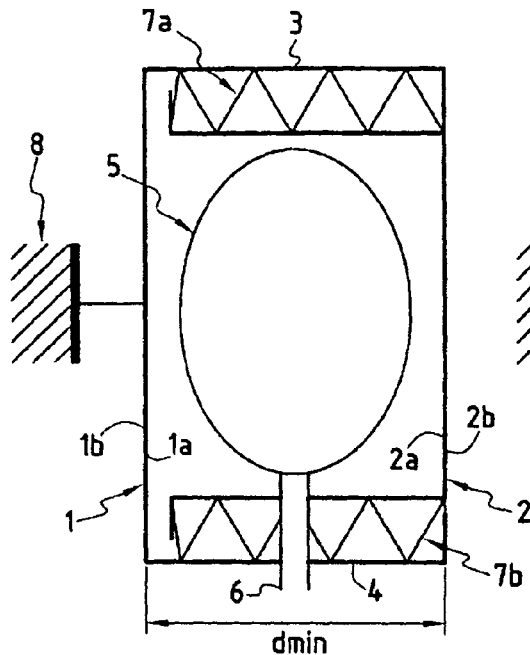

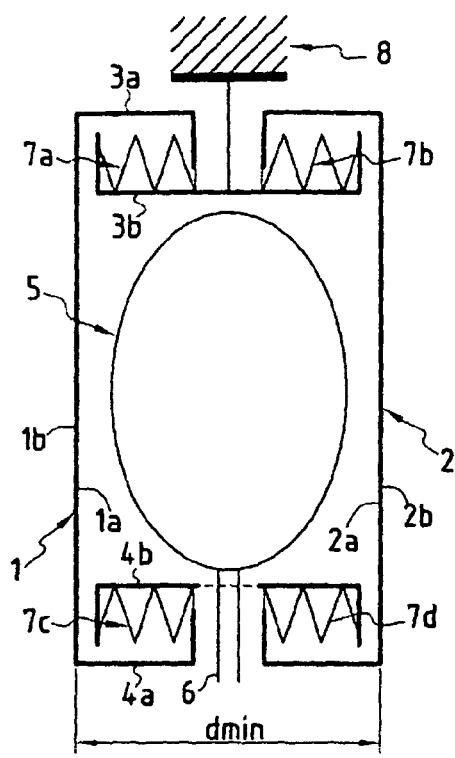
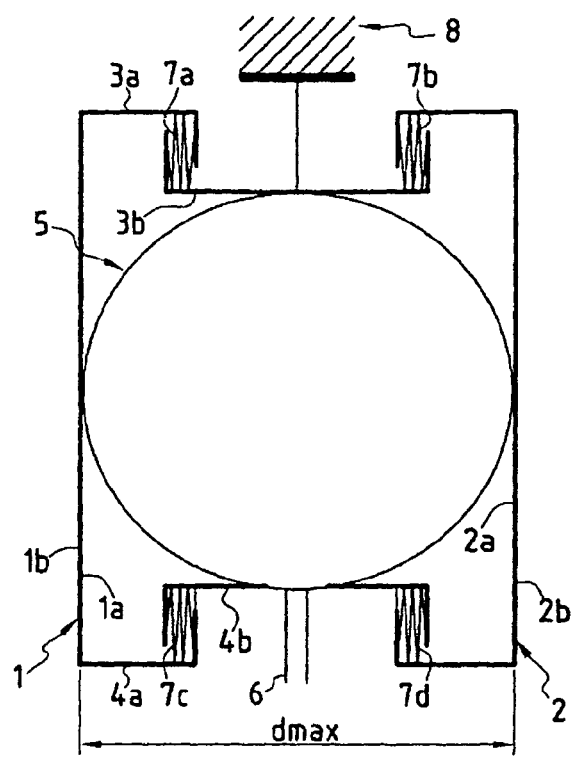
FIG.2A
FIG.2B
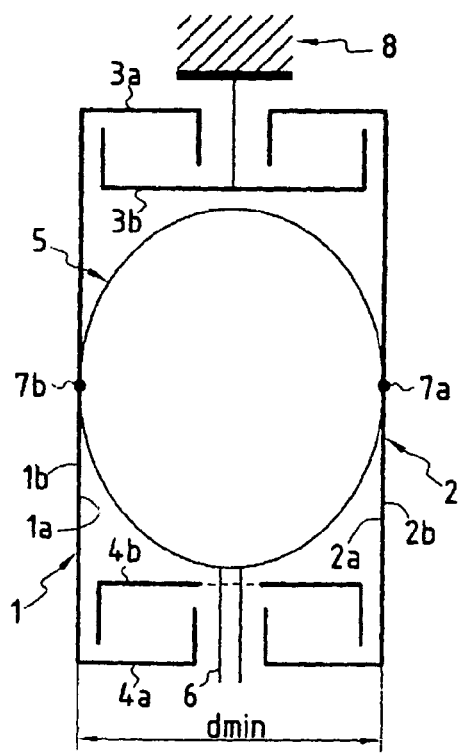
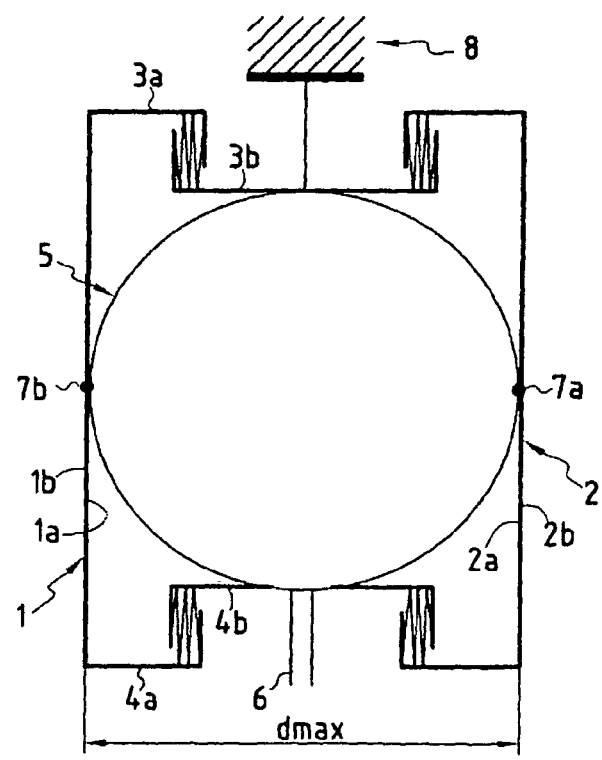
FIG.2C
FIG.2D

LATERAL GUIDING DEVICE FOR A HANDLING SYSTEM, AND HANDLING SYSTEM USING ONE SUCH DEVICE

BACKGROUND OF THE INVENTION

This present invention has as its subject a lateral guidance device for a goods-handling system, as well as a goods-handling system using such a device. It is used especially in the area of continuous goods-handling systems, in particular on conveyor belts, roller conveyors, or chain conveyors for example, or indeed occasionally on laterally-gripping elevators, distributors, continuous dividers, turners, etc. . .

In general, in such continuous goods-handling systems, the products conveyed are guided laterally between guides of parallelepiped, circular or complex section.

These guides can be fixed. If they are fixed however, these systems provide no flexibility regarding the width between the guides, and therefore regarding the width of the products handled. In addition, it is necessary to modify the whole handling line in order to adjust this width on a change of the products handled.

In order to avoid such a long and costly operation, laterally adjustable guides have already been used in a manner to allow the guidance width to be altered. In this case, the adjustment can be manual, but this gives rise to the same problems as the modification mentioned above, or indeed can be achieved by pneumatic or electrical actuators.

In this last case of adjustment by actuators or jacks, whether pneumatic or electric, the size of the devices used is too great, and the technical implementation solutions prove to be costly, in particular in the curved parts of the conveyor system or in the case of conveying several products on several routes side by side.

There is therefore a need for a lateral guidance device for such goods-handling systems that allows the guidance width to be altered easily without the need to implement expensive and bulky technical solutions.

The purpose of the invention is therefore to overcome these drawbacks. To this end, according to a first aspect, the invention concerns a lateral guidance device for products moving on the conveyor track of a goods-handling system. The device is of the type that includes at least one hollow guide located along at least one part of the conveyor track and including at least two lateral profiles fitting together with each other. Each of these lateral profiles includes an inner face and a outer face, with at least one of these outer faces being a lateral external guidance face. The hollow guide also includes an upper face and a lower face. The guidance device of the invention is also equipped with means for the lateral adjustment of this lateral external guidance face, and is characterised in that it includes at least one expandable chamber housed in the hollow guide, and at least one means for supplying this expandable chamber with expansion fluid, so that the distance between the respective outer faces of profiles is adjustable as a function of the supplying of the chamber with expansion fluid between a minimum distance (chamber not expanded) and a maximum distance (chamber on maximum expansion).

The device also includes return means to facilitate the return of the lateral external faces of the profiles to the position of minimum distance between these lateral external faces, when the expandable chamber ceases to be supplied with fluid.

In an implementation variant, these return means include at least one spring connecting the two hollow guide profiles, with this spring being in the unstretched and uncompressed position when the chamber is not supplied with fluid and in the stretched or compressed position when the chamber is supplied with fluid.

In another implementation variant, possibly in combination with the previous one, the expandable chamber is affixed to at least one of the inner faces of the respective profiles.

The following implementation variants can also be considered, possibly in combination with the preceding ones:
  the means for supplying the expandable chamber is a compressed-air means,
  at least one of the lateral profiles is a metal profile,
  at least one additional profile, possibly in plastic or indeed in metal, for the guidance of products of complex shape, is attached to the outer lateral guidance face,
  the device includes several hollow guides assembled so as to form a hollow guide of considerable length, possibly with at least one of assembled hollow guides being curved, and possibly a separate expandable chamber for each of the assembled hollow guides.

According to a second aspect, the invention concerns a goods-handling system, in particular of the conveyor type, which includes at least one frame structure and at least one conveyor track. The system of the invention also characteristically includes, on the conveyor track and fixed to the frame structure, at least one lateral guidance device according to the invention and as explained previously.

In an implementation variant, the guidance device is fixed to the system frame structure by at least one of the lateral hollow guide profiles.

In another implementation variant, possibly in combination with the first, the guidance device is fixed to the system frame structure by at least one of the upper and lower faces of the hollow guide.

Thus, the lateral guidance device and the goods-handling system according to the invention, are used advantageously to guide products on a conveyor track of variable width by simple adjustment of the quantity of fluid supplying the expandable chamber, and in particular facilitate adjustments at the curved parts of the conveyor track. The guidance device and the goods-handling system according to the invention also facilitate the conveyance of products on several routes side by side.

BRIEF DESCRIPTION OF THE DRAWING FIGURES

Figure 3A:
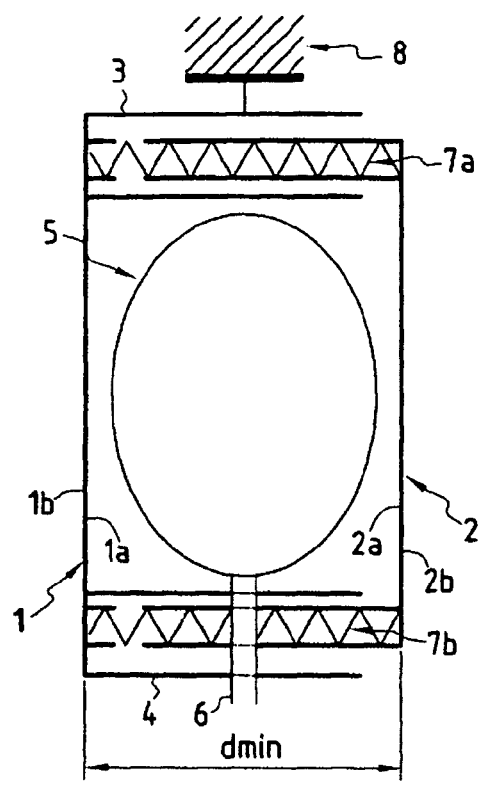
Figure 3B:
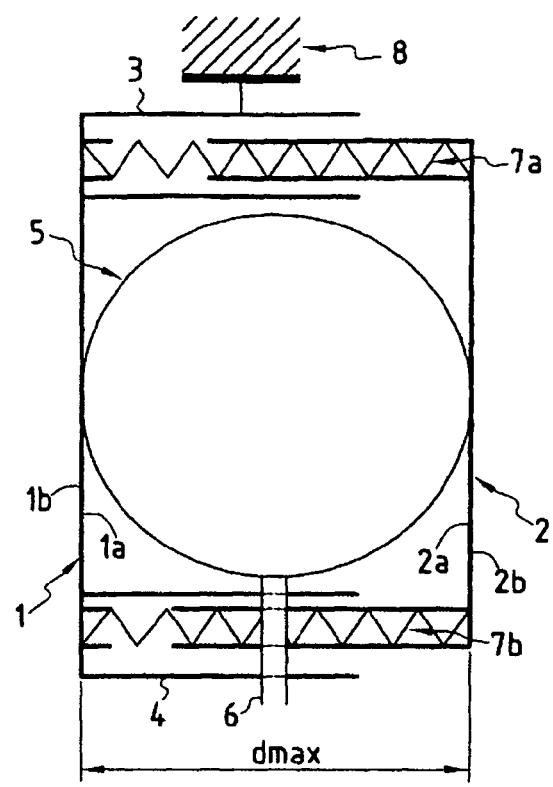
Figure 3C:
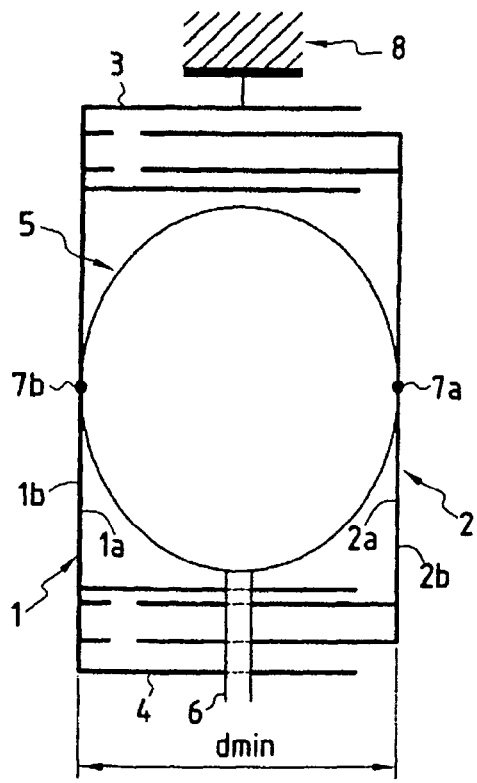
Figure 3D:
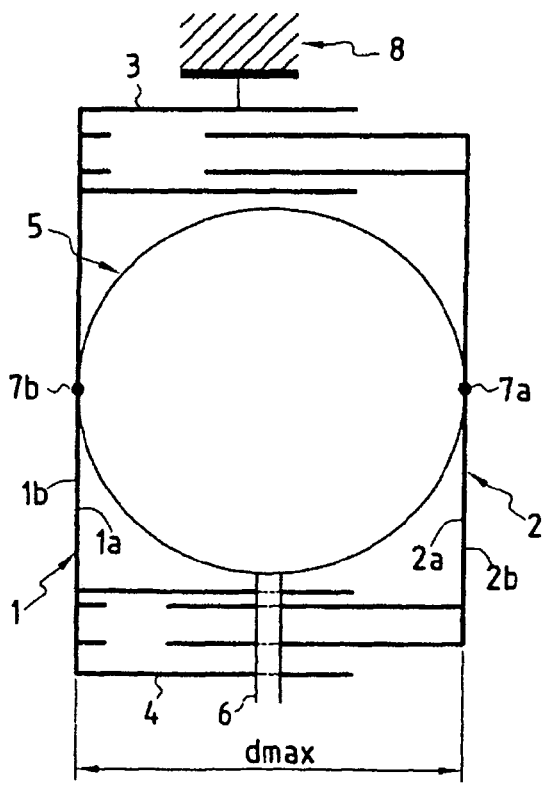
Figure 4:
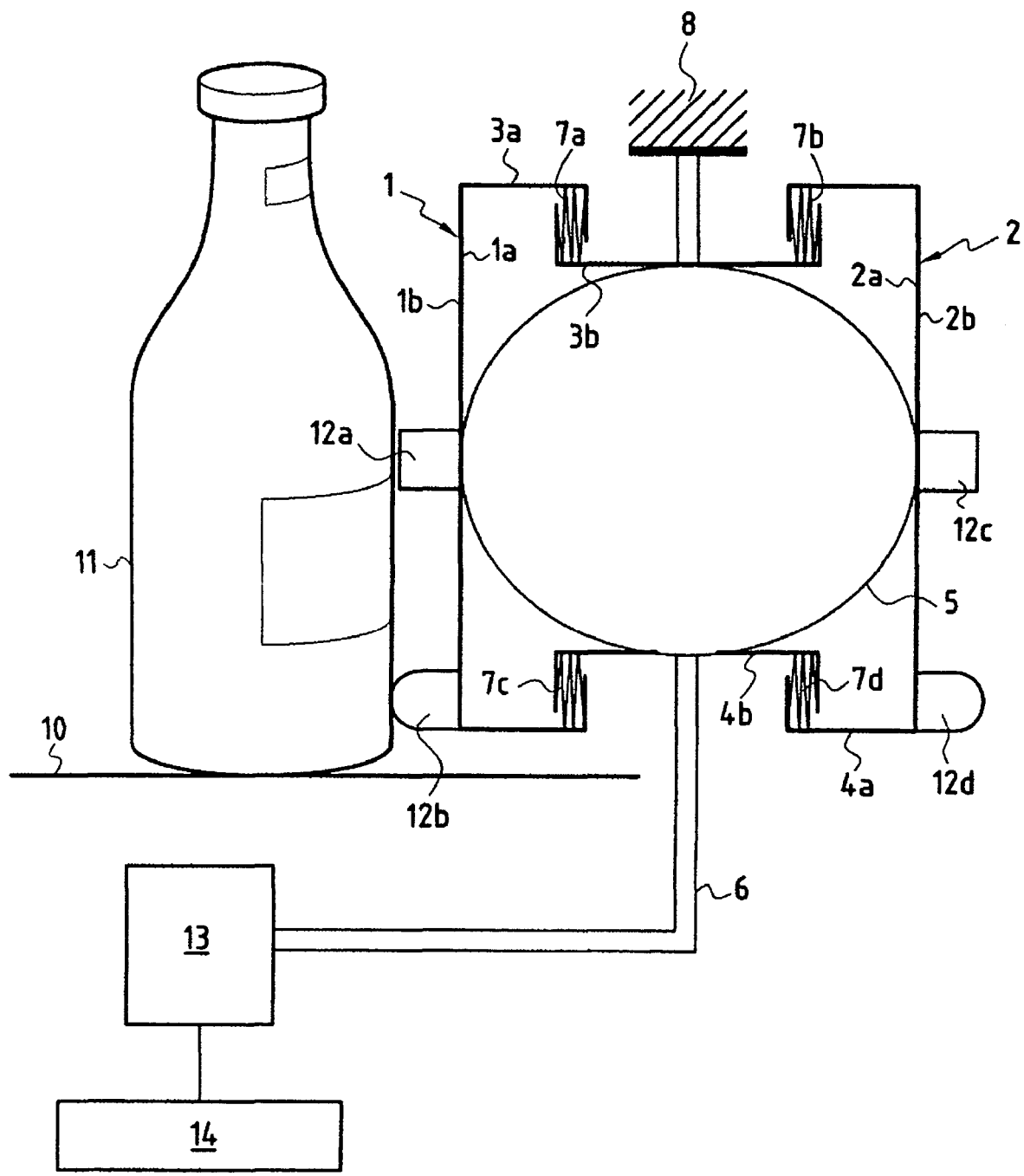

Other characteristics and advantages of the invention will appear more clearly and in a more complete manner on reading the description that follows of preferred implementation variants, which are given by way of non-limiting examples and with reference to the following appended drawings:

FIGS. 1a to 1d schematically show a first example of implementation of the device of the invention, FIGS. 2a to 2d schematically show a second example of implementation of the device of the invention, FIGS. 3a to 3d schematically show a third example of implementation of the device of the invention, FIG. 4 schematically show a fourth example of implementation of the device of the invention.

FIGS. 1a to 1d schematically show a first example of implementation of the device of the invention.

DETAILED DESCRIPTION OF THE PREFERRED EMBODIMENTS

Figure 1B:
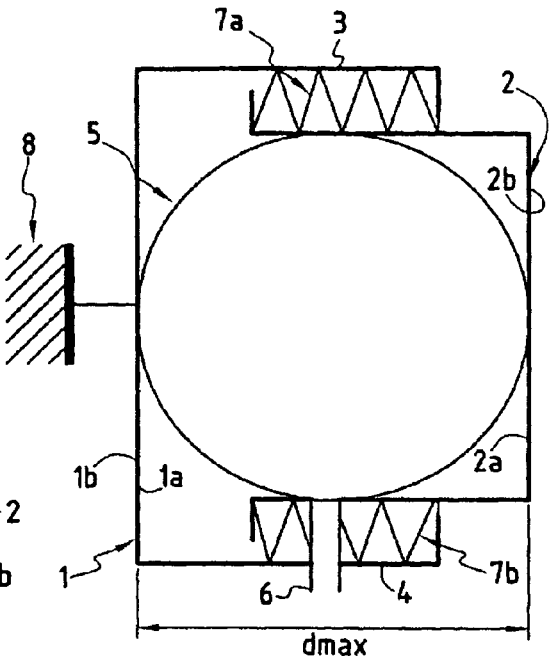

The device is composed of a hollow guide with two lateral profiles 1 and 2 fitting together with each other. On the inside of this hollow guide is housed an expandable chamber 5 supplied with expansion fluid via a feed conduit 6 which itself is connected to a source of expansion fluid. The expansion fluid is preferably air. By expandable chamber is meant a chamber whose volume varies as a function of the quantity of expansion fluid injected into it. For example, it can be a conventional air chamber (tube) in a material of the expandable type. In this implementation example, the device is fixed to the frame structure 8 of a goods-handling system by means of the outer lateral face 1*b* of profile 1. The outer lateral face 2*b* of profile 2 then performs the role of lateral external guidance face. In FIG. 1*a*, the device is shown in its rest position, which is with the distance between the lateral external faces 1*b* and 2*b* of profiles 1 and 2 being at its minimum value (dmin). In FIG. 1*b*, the device is shown in the position of maximum expansion, with the expandable chamber 5 itself being on maximum expansion. The distance between the lateral external faces 1*b* and 2*b* of profiles 1 and 2 is then at its maximum value (dmax).

The device of FIGS. 1*a* and 1*b* also includes return means 7*a* and 7*b* to facilitate the return of the lateral external faces 1*b* and 2*b* of profiles 1 and 2 to the position of minimum distance dmin between these lateral external faces 1*b* and 2*b* when the expandable chamber 5 ceases to be supplied with fluid, in other words when one passes from the state of FIG. 1*b* to the state of FIG. 1*a*. In this implementation example, these return means are composed of a spring 7*a* located in the upper part of the device and connecting profile 1 to profile 2, and a second spring 7*b*) located in the lower part of the device also connecting profile 1 to profile 2. When the device is in its rest position (FIG. 1*a*), the springs 7*a* and 7*b* are in their rest position. When the device is in the expanded position, possibly fully expanded (FIG. 1*b*), the springs 7*a* and 7*b* are in the compressed position, possibly fully compressed.

Thus, the distance between the lateral external faces 1*b* and 2*b* of profiles 1 and 2 is directly proportional to the pressure in the expandable chamber 5.

Figure 1C:
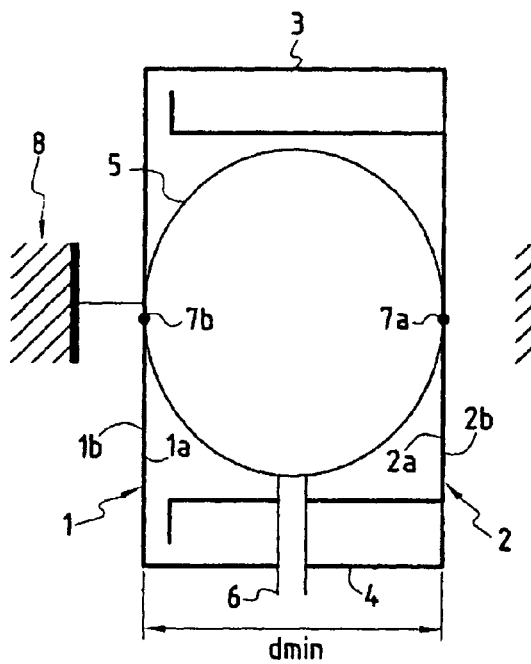
Figure 1D:
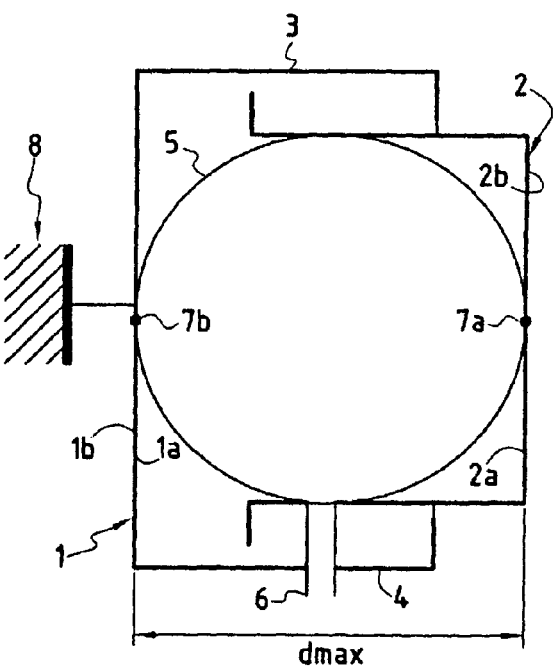

The device of FIGS. 1*c* and 1*d* is identical to that of FIGS. 1*a* and 1*b*, with the exception of the return means. In fact, in these two figures, the springs have been removed, and the expandable chamber 5 has been affixed to the lateral inner face 2*a* of profile 2, at a point 7*a*. Thus, when the expandable chamber 5 is in its fully-expanded position (FIG. 1*d*), if this expandable chamber 5 is then subjected to vacuum, then profile 2 easily returns to its rest position following the return of the expandable chamber 5 to the its rest position, as a result of the fixing point 7*a*.

It is very easy to envisage combining the use of springs, as explained in FIGS. 1*a* and 1*b*, with the technique of affixing the expansion chamber 5 to one of lateral inner walls 1*a* and 2*a* of profiles 1 and 2 (possible affixing to the two lateral inner faces at two points 7*a* and 7*b*).

FIGS. 2*a* to 2*d* schematically show a second example of implementation of the device of the invention, which differs from that of FIGS. 1*a* to 1*d* in that the shape of profiles 1 and 2 is different, and therefore in that the fit between these two profiles is different. In this configuration, the return means are composed, in FIGS. 2*a* to 2*b*, of four springs 7*a*, 7*b*, 7*c* and 7*d*. In addition, the device is fixed to the frame structure 8 of the goods-handling system by its upper face 3, which itself is composed of parts 3*a* and 3*b*.

The operating principle of the return means is identical to that described for FIGS. 1*a* and 1*b*, namely that the springs are in the rest position when the expandable chamber 5 and therefore the device itself, are in the rest position, and in the position of maximum compression when the expandable chamber 5 and therefore the device, are in the fully-expanded position.

FIGS. 2*c* and 2*d* differ simply from FIGS. 2*a* and 2*b* respectively, in that the springs 7*a*, 7*b*, 7*c* and 7*d* are no longer necessary since the expandable chamber 5 is affixed to at least one of lateral inner faces 1*a* and 2*a* of profiles 1 and 2. In the case of a device with two lateral external guidance faces 1*b* and 2*b*, it is necessary that the expandable chamber 5 should in fact be affixed to the two lateral inner faces 1*a* and 2*a*. In other words, it is necessary to have a means of returning each lateral external guidance face.

FIGS. 3*a* to 3*d* schematically show a third example of implementation of the device of the invention, which here again differs from previous examples in that the shape of profiles 1 and 2 is different and therefore in that the fit between these two profiles is different. In this example, the device is again fixed to the frame structure 8 of the goods-handling system by its upper face 3.

The return means, in FIGS. 3*a* and 3*b*, here again are composed of two springs 7*a* and 7*b*. In FIG. 3*a*, the device is in its rest position (expandable chamber 5 in its rest position), and the springs 7*a* and 7*b* are in their rest position. On the other hand, in contrast to the examples of FIGS. 1*b* and 2*b*, in FIG. 3*b*, with the device in its fully-expanded position (expandable chamber 5 in maximum expansion), the springs 7*a* and 7*b* are in the fully-stretched position instead of being in the fully compressed position.

FIGS. 3*c* and 3*d* for their part, show the device in its rest position and in its fully-expanded position respectively, with removal of springs 7*a* and 7*b*, which are replaced by one or two affixing points 7*a* and 7*b* of the expandable chamber 5 onto one or both lateral inner faces 1*a* and 2*a* of profiles 1 and 2.

FIG. 4 schematically shows a fourth example of implementation of the device of the invention, which is based on that described in FIGS. 2*a* and 2*b*, with however the addition of extra profiles 12*a*, 12*b*, 12*c* and 12*d* for the guidance of products 11 of complex shape on the conveyor track 10. These added profiles are possibly in plastic or metal material.

The device of FIG. 4 is equipped with lateral adjustment means, in a manner similar to the device of the implementation examples of FIGS. 1*a*-1*d*, 2*a*-2*d* and 3*a*-3*d* (though these adjustment means have not been shown in these previous figures). These adjustment means include a source 13 of expansion fluid, connected to the conduit 6 for supplying the expandable chamber 5 with expansion fluid, and controlled by a control unit 14 which is used to maintain a given pressure, and therefore a given volume, in the expandable chamber 5, and which therefore maintains a given distance between the lateral external faces 1*b* and 2*b* of lateral profiles 1 and 2.

Such a device, attached by part 3*b* of the upper part 3 of the device to the frame structure 8 of the goods-handling system, is used to achieve a symmetrical expansion of each of profiles 1 and 2. It thus allows products of complex shape to be guided laterally on two tracks of a parallel-type conveyor.

All of the above description is given by way of examples, and does not limit the invention. In particular, the choice of means to return the device to its rest position does not limit the invention. Any means of returning the profile or profiles to the initial rest position will suffice.

Likewise, the shape of profiles 1 and 2 does not limit the invention. Any other shape, whether circular, parallelepiped or complex, can be used, on condition that these profiles 1 and 2 are designed so that they fit onto each other in a manner that allows expansion and then return to the rest position.

In addition, the attachment of the device to the frame structure of the goods-handling system as described above, does not limit the invention either. It is possible to combine lateral attachment and top or bottom attachment, obviously on condition that the lateral external guidance face or faces are free in relation to the frame structure.

Finally, the lateral guidance device of the invention can itself is be composed of several hollow guides as described above, assembled together so as to form a hollow guide of considerable length, possibly with curved portions composed one or more of these hollow guides, assembled so that the conveyor track is not necessarily rectilinear. Possibly, but not necessarily, it is possible in this case to envisage a separate expandable chamber 5 for each of the assembled hollow guides forming the long hollow guide. Each of these expandable chambers 5 will then be supplied via a separate feed conduit 6 for the expansion fluid. Each feed conduit 6 will be connected to a separate or single source 13 of expansion fluid. Each of the separate sources 13, or the single source 13, of expansion fluid, will preferably be controlled by a single control unit 14.

The invention claimed is:

1. A lateral guidance device for products moving on a conveyor track of a goods handling system, the device comprising:
   - at least one hollow guide located along at least one part of said conveyor track,
   - at least two lateral profiles fitting together with each other, each with an inner face and an outer face, with at least one of said outer faces being a lateral external guidance face,
   - an upper face and a lower face, where said guidance device is equipped with means for lateral adjustment of said lateral external guidance face,
   - at least one expandable chamber housed in said hollow guide,
   - at least one means to supply said expandable chamber with expansion fluid,
   - return means to facilitate the return of said lateral external faces of said profiles to a position of minimum distance between said lateral external faces, when said expandable chamber ceases to be supplied with fluid, so that the distance between said outer faces of said profiles is adjustable as a function of supplying of said chamber with expansion fluid, between said minimum distance and a maximum distance.

2. A device according to claim 1, wherein the said return means include at least one spring connecting the two profiles of said hollow guide, with said spring being in an unstretched and uncompressed position when said chamber is not supplied with fluid, and in a stretched or compressed position when said chamber is supplied with fluid.

3. A device according to claim 1, wherein said expandable chamber is affixed to at least one of said inner faces of said profiles.

4. A device according to claim 1, wherein said means to supply said expandable chamber is a compressed air means.

5. A device according to claim 1, wherein at least one of said lateral profiles fitting together with each other is a metal profile.

6. A device according to claim 1, wherein said lateral external guidance face includes at least one additional profile for the guidance of products of complex shape.

7. A device according to claim 6, wherein said additional profile is a plastic material.

8. A device according to claim 6, wherein said additional profile is metal.

9. A device according to claim 1, including several of said hollow guides assembled so as to form a hollow guide of considerable length.

10. A device according to claim 9, wherein at least one of said hollow guides assembled so as to form a hollow guide of considerable length, and is curved.

11. A device according to claim 9, including a separate expandable chamber for each of said hollow guides assembled so as to form a hollow guide of considerable length.

12. A goods handling system that includes at least one frame structure and at least one conveyor track, wherein, on the said conveyor track and fixed to said frame structure, at least one lateral guidance device according to claim 1 is provided.

13. A system according to claim 12, wherein said guidance device is fixed to said frame structure by at least one of said lateral profiles of said hollow guide.

14. A system according to claim 12, wherein said guidance device is fixed to said frame structure by at least one of said upper and lower faces of said hollow guide, and/or by at least one of the said lateral external faces of the said hollow guide.

* * * * *